United States Patent [19]

Benmussa

[11] Patent Number: 4,559,921

[45] Date of Patent: Dec. 24, 1985

[54] SELF-HEATING RECEPTACLE

[76] Inventor: Simon Benmussa, 94, Bd Pape Jean 23, 06300 Nice, France

[21] Appl. No.: 690,468

[22] Filed: Jan. 10, 1985

Related U.S. Application Data

[62] Division of Ser. No. 439,409, Nov. 5, 1982, Pat. No. 4,510,919.

[51] Int. Cl.$^4$ .............................................. F24J 1/02
[52] U.S. Cl. ................................. 126/263; 126/246
[58] Field of Search ............... 126/263, 246; 426/109, 426/113, 114; 44/3 R, 3 A; 206/222, 219

[56] References Cited

U.S. PATENT DOCUMENTS

| | | | |
|---|---|---|---|
| 827,222 | 7/1906 | Espenhayn et al. | 126/263 |
| 2,157,169 | 5/1939 | Foster | 126/263 |
| 3,865,117 | 2/1975 | Perry, III | 126/263 X |
| 3,871,357 | 3/1975 | Grosso et al. | 126/263 |

FOREIGN PATENT DOCUMENTS

| | | | |
|---|---|---|---|
| 2321745 | 11/1974 | Fed. Rep. of Germany | 126/263 |
| 790334 | 11/1935 | France | 126/263 |

*Primary Examiner*—Randall L. Green
*Attorney, Agent, or Firm*—Young & Thompson

[57] ABSTRACT

A self-heating receptacle comprising a vessel for food to be heated, and below the vessel a sealed container containing two chemicals, e.g. quick lime and water. A pouch within the container holds one of the chemicals sealed from the other. A tearing filament secured to the pouch simultaneously opens the pouch and the container thereby to trigger the exothermic reaction to heat said food vessel. The pouch is suspended by its ends above the bottom of the container and is surrounded by said other chemical. There is an outer housing in the bottom of which the container is disposed, the food vessel being disposed in the top of this housing. The container is hermetically sealed with a lid. The tearing filament extends across the lid below the bottom of the food vessel and emerges from between the housing and the food vessel in a portion that can be grasped by the user to pull on the tearing filament thereby both to open the pouch and to tear the lid.

8 Claims, 4 Drawing Figures

SELF-HEATING RECEPTACLE

RELATION OF OTHER CASES

The present application is a division of my copending application Ser. No. 439,409, filed Nov. 5, 1982, now U.S. Pat. No. 4,510,919.

BACKGROUND OF THE INVENTION

The invention has as an object a receptacle for foods and means for triggering a chemical reaction for the production of integral heat.

There presently exists a number of receptacles which are self heating. Those receptacles have a number of drawbacks. For example, it is difficult to stock those receptacles for a long time. The reactive products, if not packaged in an effectual manner become inoperative with time, generally after fifty or sixty days. The methods utilized for creating the chemical reaction which produces the heat for warming the foods are more or less effectual.

Generally, in the embodiments of the prior art there are a number of pouches of reactive product, for example calcium oxide or quick lime, or potassium hydroxide and ortho-phosphoric acid or an oxide of calcium or quick lime and a pouch of water. Means are provided to puncture the pouches to permit the reactions. Those pouches are disposed inside an upper part so that it provides a fast exothermic reaction which is rapid but often times limited because of improper mixture between the water and the reactive chemicals.

There are a number of patents which describe self heating receptacles. However, the embodiments described in the prior art have a number of drawbacks, including incomplete reaction of the quick lime and the likelihood of untimely or accidental triggering of the reaction, which can be dangerous. The present invention improves the method by which the reaction is triggered, thereby enhancing the security of the receptacles and assuring a good reaction of all of the quick lime.

The German Pat. No. 1,214,600 discloses a well-defined mixture of fruit juices and milk, and consequently does not show the use of a reactive mixture.

The device disclosed in U.S. Pat. No. 3,085,681 cannot be used for the uses contemplated by the present invention because of the risks associated with that device. There the water is necessarily contained inside an interior pocket, the quick lime cannot be absolutely saturated by the water because of the disposition of two envelopes—thereby providing an incomplete reaction of the quick lime. Additionally, the interior pocket can explode under the pressure of the vapor given off by the quick lime at the moment of reaction; alternatively, the vapor will remain trapped and consequently will not heat in some cases the foods in a third container.

U.S. Pat. No. 3,871,357 in the plane of opening of the pouch of water only opens just one time out of three or four, because the pouch is free and so are the cutting projections. In commercial applications, as well as in the patent, the risks associated with this embodiment of the prior art are great, for example, a closing plate on the projections can, if the foods are heavy, cut the vessel that holds them, or burst, when the projections are engaged in an arrested position, and even though it may have little liquid, the reaction will be triggered immediately. When stirring the vessel the pouch of water can break open when it hits the point of projections, thereby uncontrollably triggering a reaction.

In French Pat. No. 2,348,121, an adhesive band is provided to hermetically seal a pouch of water. The problem is that as a result of humidity, very high heat, or low temperatures, the adhesive band can be detached, setting off a reaction that would then be uncontrollable. In this French patent, the pouch of water is fastened at an extremity and a cord, independent of the pouch, is disposed in another extremity, that permits a certain movement to the interior of the heating vessel, thereby creating a risk of laceration and of uncontrollable reaction of the reactive chemicals during stocking, transportation or transshipment.

A Swiss process, under the name Pozell, Blanchat, Bertrand, is commercially available and in conception is substantially identical with respect to assembly of the vessels, to the assemblies as described in U.S. Pat. No. 2,871,357 and of the previously recited German and American patents, and French Pat. No. 2,348,121 which depends upon the opening of a pouch of water. The latter is fastened by one extremity to a small cardboard plate as well as the opening cord which, independently of the pouch, is also secured at one end to the cardboard. All the elements can be displaced freely, and without anchoring to the heating vessel—thereby raising the constant danger that the fastenings could perhaps cut or lacerate the vessels carrying the foods. In that event the liquids contained in the food vessel can set off the reaction. The same thing can happen if the heating vessel and the water pouch are pierced which can provoke the chemical reaction at an inopportune moment.

It should also be noted that in all of the above cited references, the quick lime is loose in the interior of the heating vessel—inviting a malfunction such as lack of total reaction, or localized reaction in the vessel, which, therefore, will not permit the perfect heating of the food contained in the upper vessel, or very often, the heating of only one part.

Also, the existing receptacles have a flat water pouch covered almost totally by the heating surface, thus providing a screen for the diffusion of heat to the upper part of the receptacle which contains the food.

SUMMARY OF THE INVENTION

The improvements of the present invention are directed to the triggering of a totally controlled reaction, a complete reaction of all the chemical products, and a homogeneous heating of the food products.

The self-heating receptacle, according to the present invention, consists of a superposition of elements in which is disposed judiciously, the heating vessel which is totally independent. The rigorous requirements of food packaging laws and hygiene are met with those techniques.

The invention has as its object to satisfy all the requirements of hygiene and safety to the profit of the user, without as a result losing efficiency.

The self-heating receptacle, according to the present invention, is designed so that the support member or food vessel holds and protects the food. Disposed below the food vessel is the heating vessel, or more accurately, the food vessel is above the heating vessel, that is the vessel that contains the products which are to be reheated. The food-carrying receptacle is, preferably, of aluminum foil to have a good contact with the heating receptacle which is below. The pouch which contains the water is a sleeve which is supported at its ends on supports in such a manner that the water pouch is suspended above the bottom, and a short distance from the heating vessel. That suspension of the water pouch or sleeve permits, at the moment of opening, a good distribution of the water throughout the quick lime.

A tearing filament is provided which has two distinct functions. The first is to open the water pouch to set off or trigger a reaction, and the second is to open the lid on the heating vessel to permit the heating of the food contained in the upper vessel.

BRIEF DESCRIPTION OF THE DRAWINGS

Further details are explained below with the help of the examples in the attached drawings in which.

DETAILED DESCRIPTION OF THE INVENTION

Figure 1:
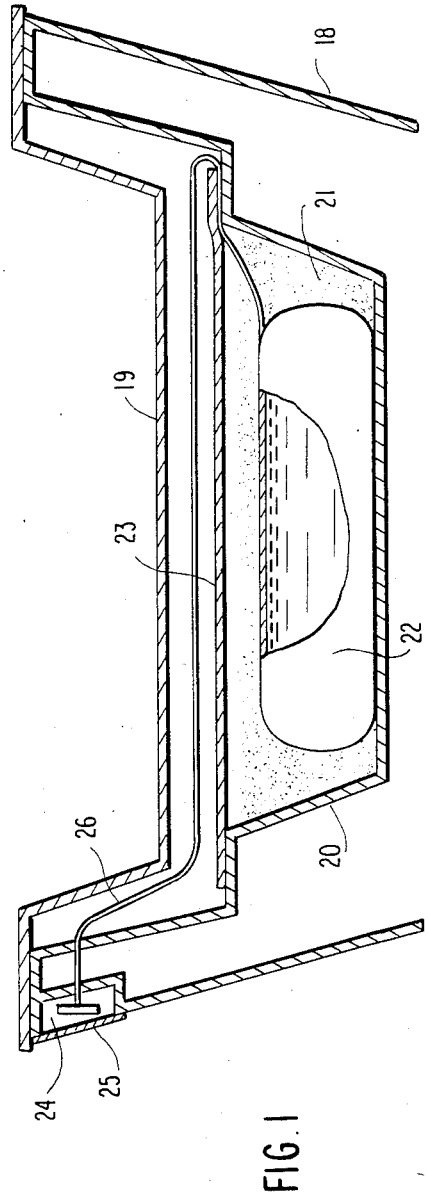
FIG. 1 is a longitudinal cross sectional view of a first embodiment of the self-heating receptacle of the invention.

There is shown in FIG. 1 a first embodiment of disposable self-heating receptacle, comprising a support member 18 supporting one or a plurality of food vessels 19. A container 20 disposed below receptacle 19 carries the reactive chemical products which can be quick lime 21 and a reservoir of water in a pouch 22. The container 20 is sealed hermetically by an impermeable but frangible lid 23.

Food vessel 19 can be 80 microns or more in thickness, and is separated from the heating vessel 20 by a gap of about 5 mm. The lid 23 of heating vessel 20 may be up to 40 microns in thickness. During and after the reaction, the lid rests above the heating vessel 20. By pulling a tearing filament 26, which extends beneath one edge of lid 23 and is secured to pouch 22, the pouch 22 is torn open and its water mixes with quick lime 21 to initiate an exothermic reaction that produces steam, and the lid 23 is cut along its center in the longitudinal direction to allow the escape of steam which heats the food vessel 19.

A protective sheet 25 is disposed on the side of the support member 18, and inside this sheet is disposed the end of the filament 26, so that by removing the sheet 25 and reaching into the recess 24 in which the end of filament 26 is disposed, grasping that end and pulling on the filament initiates the operation described above.

As material for the pouch 22 containing the water, one can use polypropylene film, polyethylene, and mixtures of polyester and polyethylene or polyethylene and polypropylene.

In certain cases, it may be desirable to keep the self-heating receptacles in a freezer in order to keep their contained food products frozen. In order to prevent the water in pouch 11 from freezing and bursting the pouch, a freezing point depressant can be added thereto, such as alcohol or methylated spirits.

The lid 23 is of impermeable material such as polystyrene such that frost which forms on the food vessel 19 during freezing, will not upon thawing trigger the premature reaction of the quick lime 21.

Figure 2:
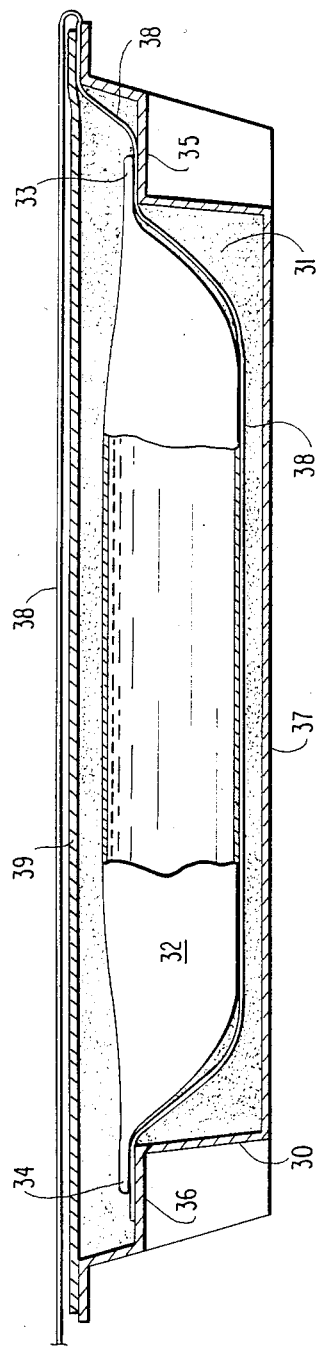
FIG. 2 is a longitudinal cross sectional view of a second embodiment showing the self-heating receptacle by itself.
Figure 3:
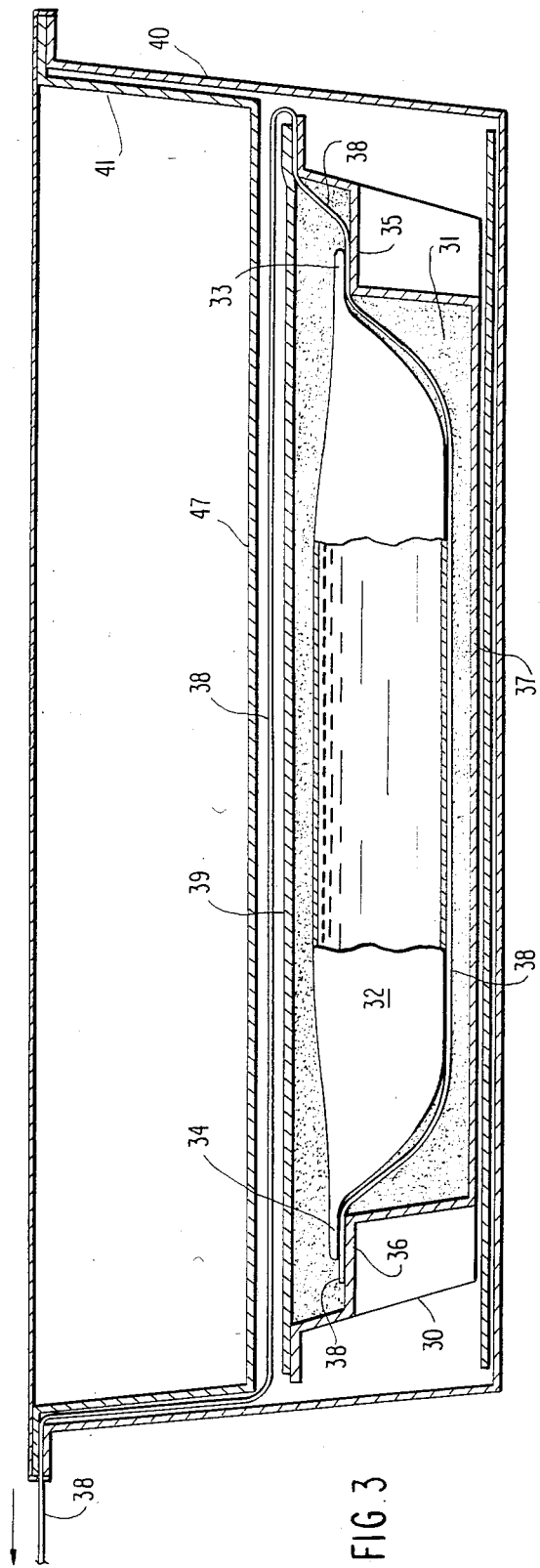
FIG. 3 is a cross sectional longitudinal view of an assembly of the outer container with the heating receptacle of FIG. 2 in the bottom thereof and the receptacle of food to be heated on top of the heating receptacle.

FIGS. 2 and 3 show a second embodiment of the invention, of which FIG. 2 shows the heating vessel alone and FIG. 3 shows the assembly of the heating vessel and the food vessel in the outer container.

In FIG. 2 is shown a heating vessel 30 having quick lime 31 therein and a sleeve or pouch of water 32. The pouch of water 32 is suspended by its ends 33 and 34, which are secured on ledges 35 and 36 of vessel 30, above the bottom 37 of heating vessel 30.

A tearing filament 38 is provided. Tearing filament 38 is secured at end 34 of water pouch 32 and passes below pouch 32, between pouch 32 and bottom 37, beneath end 33, between the edge of vessel 30 and lid 39, and above lid 39.

In FIG. 3 is shown an outer vessel 40 on the bottom of which rests the heating vessel 30 which is shown in FIG. 2. A food vessel 41 is supported by its rim on the upper rim of vessel 40, above the vessel 30. The bottom 47 of food vessel 41 is spaced above lid 39 of heating vessel 30, and the tearing filament 38 extends through this space, between 39 and 47, and then between the rims of vessels 40 and 41 and emerges in the direction of the arrow in FIG. 3, thereby providing an end that can be grasped and pulled by the user. When this is done, filament 38 tears lid 39 loose from heating vessel 30 as seen at the right side of FIG. 3, and then begins to split water pouch 32 beginning at end 33 thereof. The simultaneous splitting of lid 39 and pouch 32 proceeds from right to left as seen in FIG. 3, which not only opens pouch 32 but also serves thoroughly to mix the water from pouch 32 with quick lime 31 thereby to provoke an exothermic reaction releasing steam, and at the same time splits lid 39 from right to left as seen in FIG. 3, thereby to permit this steam to contact and heat bottom 47 of food vessel 41. It will be understood that the fastening of end 33 of pouch 32 to ledge 35 ensures that filament 38 will split pouch 32 beginning at that end, and that thereafter, filament 38 so distorts pouch 32 as not only to expel the water contained therein but also to tend to mix that water thoroughly with the quick lime 31.

Figure 4:
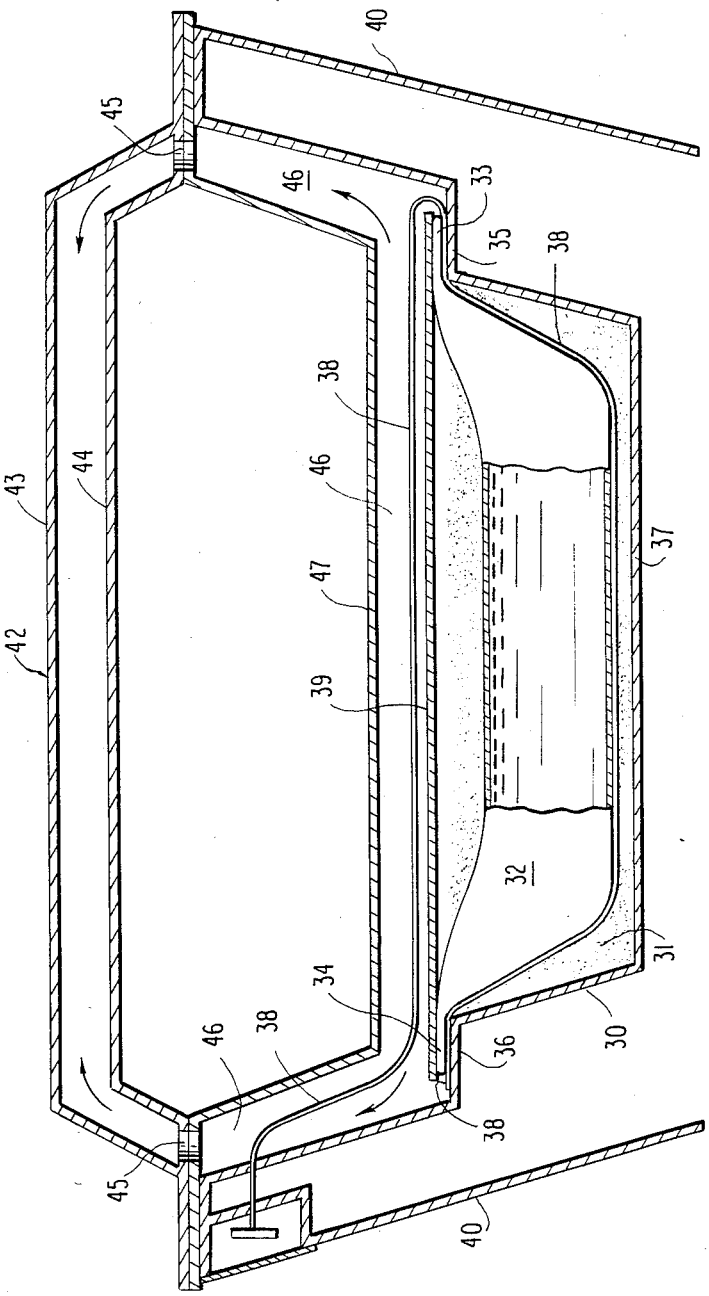
FIG. 4 is a cross sectional longitudinal view of another embodiment of an assembly of the outer container containing the heating vessel and the food vessel and, in addition, a cover for the same.

FIG. 4 represents another embodiment of the self-heating receptacle, including a cover 42. The cover 42 is made of two parts 43 and 44. Space is provided between parts 43 and 44 to serve as a chamber for hot vapors from the heating vessel 30. The cover 42 is provided with small conduits or chimneys 45 which are disposed in communication with a chamber 46 formed by the bottom 47 of the food carrying vessel 41 and the lid 39 or the chamber of the heating vessel 30. When the filament 38 is pulled, it exerts a force on the secured extremity 33 of the pouch 32, thereby rupturing the pouch. At the same time the cord tears or peels away the lid 39 on the heating vessel 30. The piercing or removal of the lid 39 allows the steam to enter into the space between the lid and the bottom 47 of the food vessel 41. The steam also enters the chamber 46 and rises through conduits 45 into the space between the parts 43 and 44 of the cover 42. In this fashion heat is provided on all surfaces of the receptacle.

In certain northern climates, where temperatures can reach −15° or −20° C., it is difficult when using a conventional receptacle to reheat the food conveniently. The foods at the bottom will be warm and those at the top will be cold. The cover 43 can be made of two walls, the exterior in polypropylene and the interior polypropylene fused on aluminum. In between the two is a space, which is in communication with the small conduits or chimneys 45 which in turn are in communication with the heating chamber 46 of the vessel. The vapor passes also in the cover and reheats equally and sufficiently all of the food in the food-carrying vessel or container.

Filament 38 can be glued, heat sealed or fixed to the pouch 32. The material of the filament 38 can vary with the material of the pouch 32, and also the impermeable lid 39. The material should permit filament 38 to form a perfect seal without adherence to the lid 39. The conduits 45 may be sealed or stopped up while in storage.

The filament 38 can be glued, firmly attached or fixed to the exterior of the pouch 32. The position of the filament 38 is such that upon pulling thereon, it splays the center of the pouch 32 and the lid 39. Thus, tension on 38 permits the water pouch to irrigate regularly, totally, and rapidly, the space between the bottom of pouch 32 and the bottom of the heating vessel 30, because the water pouch is suspended by its extremities 33 and 34 above the bottom of the heating vessel 30. That operation permits, because of the cutting of the lid, the vapor created by the exothermic reaction to escape, and thereby heat the foods contained inside the upper vessel without diminishing the safety due to the thickness of the lid 39 when intact.

The cover 43 has three principal functions:
(a) To protect the foods and to prevent spillage;
(b) To serve as a serving dish or as a board for cutting; and
(c) To serve equally in certain cases as an oven.

It will thus be seen that the objects set forth above, among those made apparent from the preceding description, are efficiently attained, and, since certain changes may be made in the constructions set forth without departing from the scope of the invention, it is intended that all matter contained in the above description, or shown in the accompanying drawings, shall be interpreted as given by way of illustration and not in a limiting sense.

What is claimed is:

1. A self-heating receptacle comprising a vessel for food to be heated, and below said vessel a container sealed by a lid containing two chemicals which are reagents in an exothermic reaction, a pouch within said container in which one of said chemicals is sealed from the other chamical, and a flexible tearing filament for simultaneously opening the pouch and opening said container thereby to permit said chemicals to contact each other and to take part in said exothermic reaction thereby to heat said food vessel, said tearing filament being connected to said pouch and so arranged that upon pulling said tearing filament, said tearing filament creates a line of tear across both the pouch and the lid.

2. A receptacle as claimed in claim 1, in which said pouch is suspended by its ends above the bottom of the container and is surrounded by said other chemical.

3. A receptacle as claimed in claim 2, in which said ends of said pouch are secured to upwardly facing ledges on said container.

4. A receptacle as claimed in claim 1, in combination with a housing in the bottom of which said container is disposed, said food vessel being disposed in said housing on top of said container.

5. A receptacle as claimed in claim 4, said food vessel having a bottom that is spaced a short distance above the upper surface of said container.

6. A receptacle as claimed in claim 4, said tearing filament extending across said lid below the bottom of said food vessel and emerging from between said housing and said food vessel in a portion that can be grasped by the user to pull on the tearing filament thereby both to split both the pouch and the lid.

7. A receptacle as claimed in claim 1, in which the chemical is said pouch is water containing an anti-freeze additive.

8. A receptacle as claimed in claim 1, said flexible tearing filament terminating in a free end disposed in an outwardly opening recess in said container, and a removable protective sheet closing said recess.

* * * * *